US008861439B2

(12) United States Patent
Ou et al.

(10) Patent No.: US 8,861,439 B2
(45) Date of Patent: Oct. 14, 2014

(54) METHOD AND APPARATUS FOR LOG REPORTING IN A WIRELESS COMMUNICATION SYSTEM

(75) Inventors: Meng-Hui Ou, Taipei (TW); Yu-Hsuan Guo, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 19 days.

(21) Appl. No.: 13/331,438

(22) Filed: Dec. 20, 2011

(65) Prior Publication Data

US 2012/0155390 A1 Jun. 21, 2012

Related U.S. Application Data

(60) Provisional application No. 61/425,688, filed on Dec. 21, 2010.

(51) Int. Cl.
*H04W 24/10* (2009.01)
*H04W 24/00* (2009.01)
*H04W 28/06* (2009.01)

(52) U.S. Cl.
CPC .............. *H04W 24/10* (2013.01); *H04W 24/00* (2013.01); *H04W 28/06* (2013.01)
USPC ........... 370/328; 370/242; 370/244; 370/245; 370/255; 455/522; 455/436; 455/442; 455/440; 455/445

(58) Field of Classification Search
USPC ........................................................ 370/328
See application file for complete search history.

(56) References Cited

U.S. PATENT DOCUMENTS

| 8,199,730 | B2 * | 6/2012 | Ou et al. | 370/336 |
| 8,200,226 | B2 * | 6/2012 | Ou et al. | 455/437 |
| 8,391,887 | B2 * | 3/2013 | Suzuki et al. | 455/456.1 |
| 2007/0223433 | A1 * | 9/2007 | Watanabe | 370/338 |

(Continued)

FOREIGN PATENT DOCUMENTS

JP 2007266725 A 10/2007
JP 2008289148 A 11/2008

(Continued)

OTHER PUBLICATIONS

Radio Measurement Collection for Minimization of Drive Tests (MDT); Overall description (3GPP TS 37.320, Release 10, Nov. 2010).*

(Continued)

*Primary Examiner* — Ian N Moore
*Assistant Examiner* — Lakeram Jangbahadur
(74) *Attorney, Agent, or Firm* — Blue Capital Law Firm, P.C.

(57) ABSTRACT

A method and apparatus for log reporting in a wireless communication system includes receiving a request message by a user equipment (UE), the request message requesting log reporting, wherein at least one logged measurement entry is stored in the UE and the at least one logged measurement entry corresponds to a current Registered Public Land Mobile Network (RPLMN); including all or parts of the at least one logged measurement entry in a response message; including an indication in the response message if less than all of the at least one logged measurement entry is included in the response message; and not including the indication in the response message if all of the at least one logged measurement entry is included in the response message.

18 Claims, 6 Drawing Sheets

(56) References Cited

U.S. PATENT DOCUMENTS

| | | | |
|---|---|---|---|
| 2008/0287126 A1* | 11/2008 | Kuo | 455/432.1 |
| 2010/0190488 A1* | 7/2010 | Jung et al. | 455/424 |
| 2010/0322068 A1* | 12/2010 | Grahn et al. | 370/217 |
| 2010/0330921 A1* | 12/2010 | Kim et al. | 455/67.11 |
| 2011/0003555 A1* | 1/2011 | Guo | 455/67.11 |
| 2011/0250880 A1* | 10/2011 | Olsson | 455/423 |
| 2012/0015657 A1* | 1/2012 | Comsa et al. | 455/436 |
| 2012/0028611 A1* | 2/2012 | Wu | 455/411 |
| 2012/0039189 A1* | 2/2012 | Suzuki et al. | 370/252 |
| 2012/0069782 A1* | 3/2012 | Kuo et al. | 370/311 |
| 2012/0106356 A1* | 5/2012 | Johansson et al. | 370/241.1 |
| 2012/0108199 A1* | 5/2012 | Wang et al. | 455/405 |
| 2012/0243418 A1* | 9/2012 | Ou et al. | 370/241 |
| 2013/0077517 A1* | 3/2013 | Cho et al. | 370/252 |

FOREIGN PATENT DOCUMENTS

| | | | |
|---|---|---|---|
| KR | 20080101806 A | | 11/2008 |
| WO | 2007015460 A1 | | 2/2007 |
| WO | 2009133599 A1 | | 11/2009 |

OTHER PUBLICATIONS

3GPP TSG SA WG2 Meeting#81, Oct. 11-15, 2010, Prague, Czech Republic (S2-105078).

Search Report on corresponding EP Patent Application No. 11009965.2 dated Mar. 15, 2012.

3GPP TSG SA WG2 Meeting #81, Oct. 11-15, 2010, Prague, Czech Republic (S2-105078).

3GPP TSG-RAN WG2 Meeting #72, Jacksonville, U.S.A. Nov. 15-19, 2010 (R2-106931).

Office Action on corresponding foreign application (KR 10-2011-0139221) from KIPO dated May 23, 2013.

Office Action on corresponding foreign application (KR 10-2011-0139222) from KIPO dated May 28, 2013.

Office Action on corresponding foreign application (JP 2011-277854) from JPO dated Apr. 2, 2013.

3GPP TSG-RAN WG2 Meeting #72, Jacksonville, U.S.A., Nov. 15-19, 2010 (R2-106931).

3GPP TS 37.320 V10.0.0 (Dec. 2010).

Office Action on corresponding foreign application (TW 100147698) from TIPO dated Jan. 20, 2014.

* cited by examiner

METHOD AND APPARATUS FOR LOG REPORTING IN A WIRELESS COMMUNICATION SYSTEM

CROSS-REFERENCE TO RELATED APPLICATIONS

The present application claims the benefit of U.S. Provisional Patent Application Ser. No. 61/425,688, filed on Dec. 21, 2010, the entire disclosure of which is incorporated herein by reference.

FIELD

This disclosure generally relates to wireless communication networks, and more particularly, to a method and apparatus for log reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

According to one aspect, a method of log reporting in a wireless communication system includes receiving a request message by a user equipment (UE), the request message requesting log reporting, wherein at least one logged measurement entry is stored in the UE and the at least one logged measurement entry corresponds to a current Registered Public Land Mobile Network (RPLMN); including all or parts of the at least one logged measurement entry in a response message; and including an indication in the response message if less than all of the at least one logged measurement entry is included in the response message. The method further includes not including the indication in the response message if all of the at least one logged measurement entry is included in the response message.

According to another aspect, a communication device for use in a wireless communication system includes a control circuit, a processor installed in the control circuit, and a memory installed in the control circuit and coupled to the processor. The processor is configured to execute a program code stored in memory to perform log reporting by receiving a request message by a user equipment (UE), the request message requesting log reporting. wherein at least one logged measurement entry is stored in the UE and the at least one logged measurement entry corresponds to a current Registered Public Land Mobile Network (RPLMN): including all or parts of the at least one logged measurement entry in a response message; including an indication in the response message if less than all of the at least one logged measurement entry is included in the response message; and not including the indication in the response message if all of the at least one logged measurement entry is included in the response message.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced), 3GPP2 UMB (Ultra Mobile Broadband). WiMax, or some other modulation techniques.

In particular, The exemplary wireless communication systems devices described below may be designed to support one or more standards such as the standard offered by a consortium named "3rd Generation Partnership Project" referred to herein as 3GPP. including Document Nos. R2-106936, "3GPP TS 37.320 V2.0.0 (2010-11) Radio measurement collection for Minimization of Drive Tests (MDT); Stage 2 (Release 10)"; R2-106937, "Introduction of Minimization of Drive Tests", Nokia Siemens Networks, Nokia Corporation; 3GPP TS 36.321 V9.3.0 (2010-06), "E-UTRA; MAC protocol specification"; 3GPP TS 36.322 V9.3.0 (2010-06). "E-UTRA; RLC protocol specification"; and 3GPP TS 36.331 V9.4.0 (2010-09), "E-UTRA; RRC protocol specification". The standards and documents listed above are hereby expressly incorporated herein.

Figure 1:
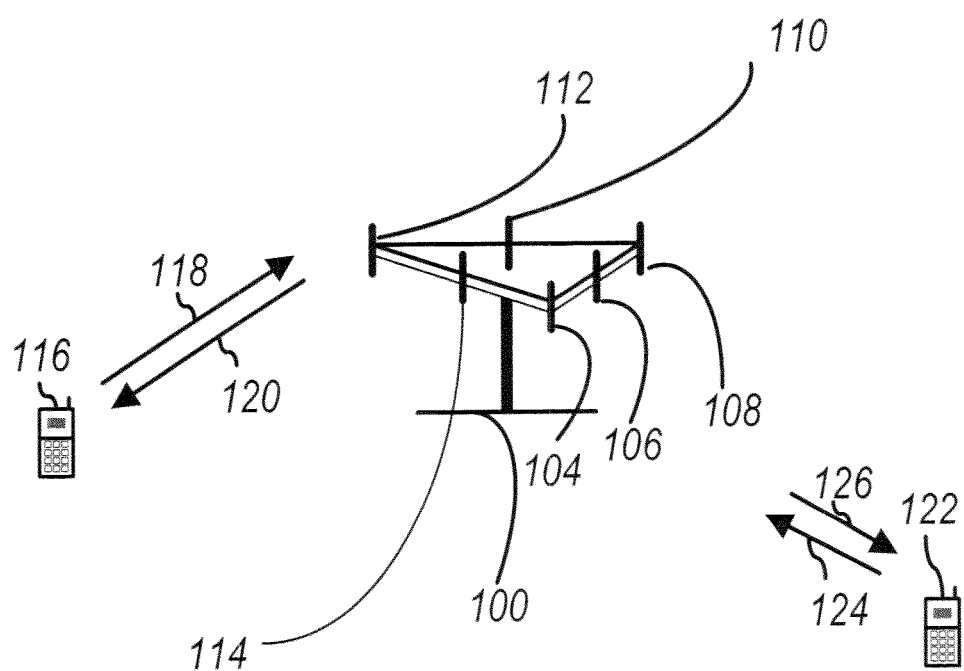
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE). a wireless communication device, terminal, access terminal or some other terminology.

Figure 2:
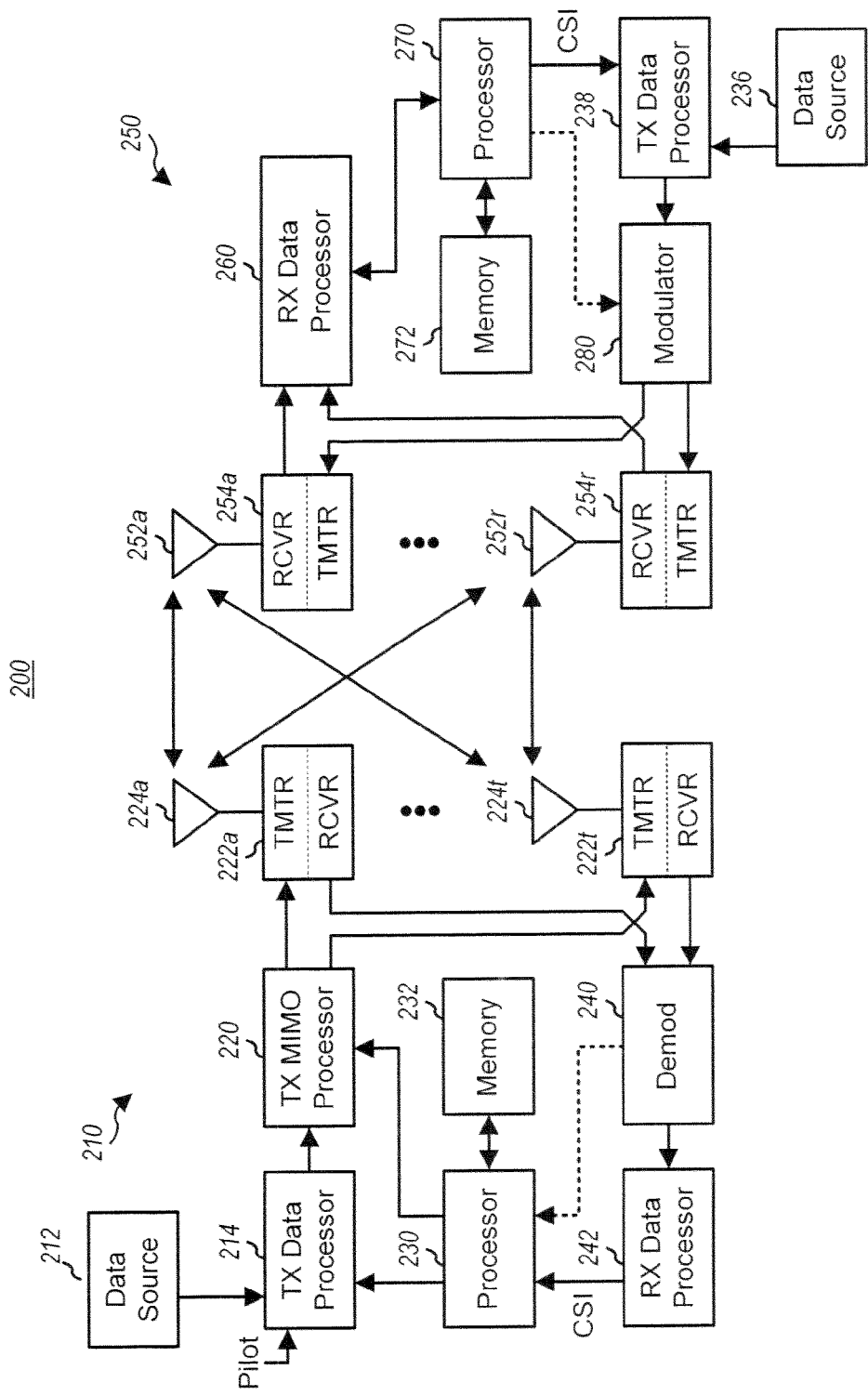
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (LTE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g. amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples. and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
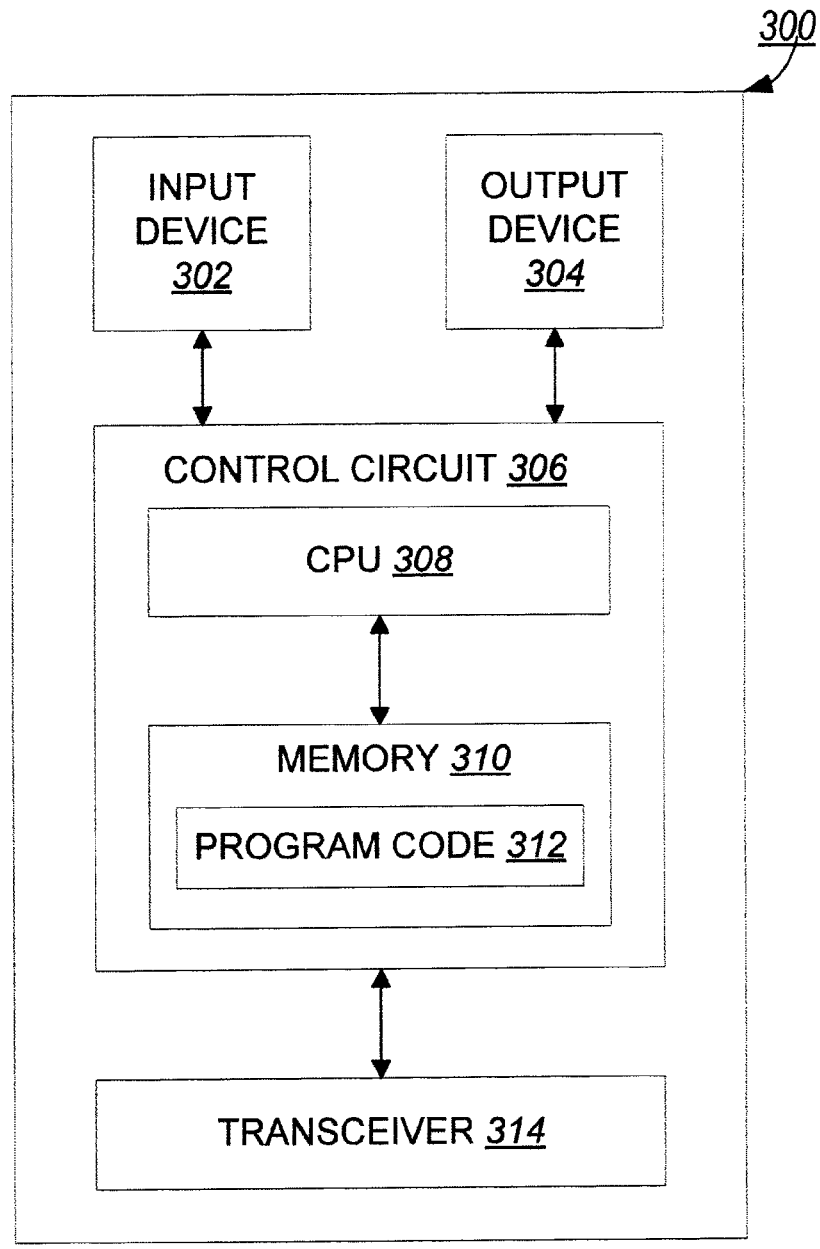
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302. an output device 304, a control circuit 306, a central processing unit (CPU) 308. a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
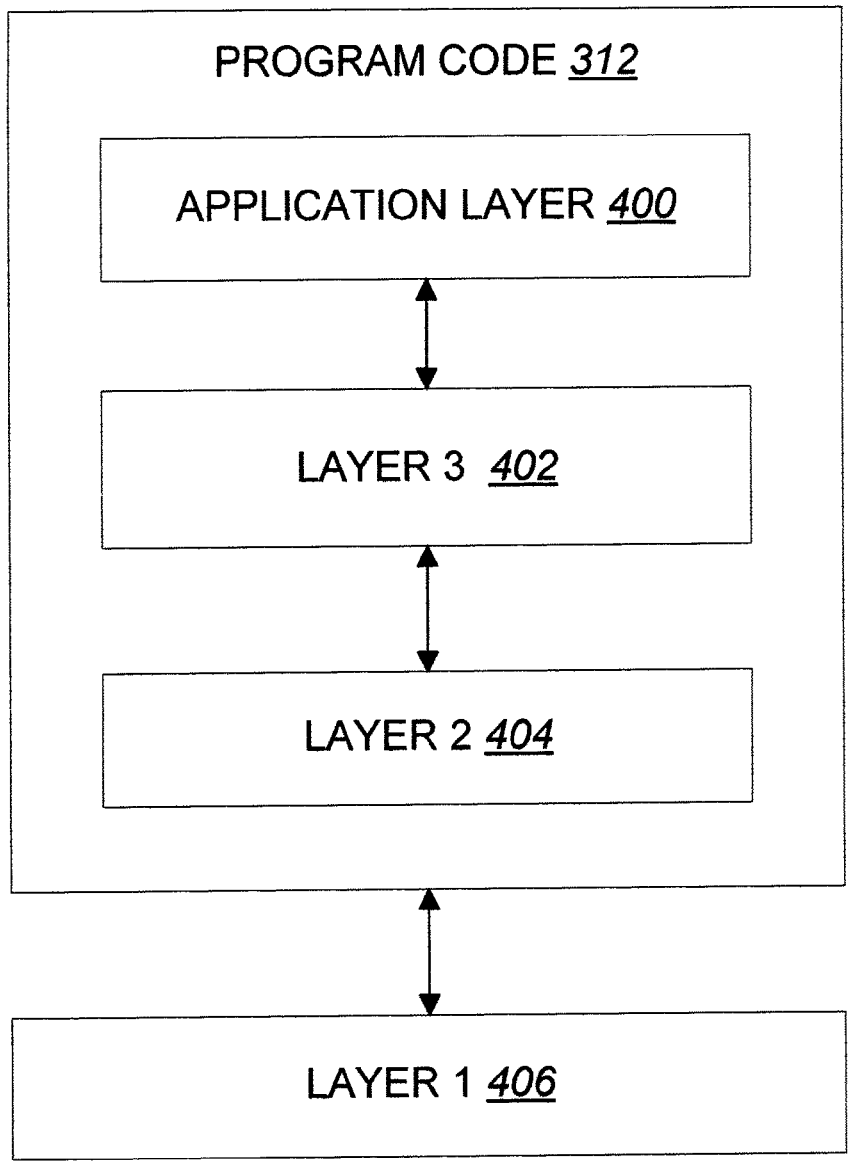
FIG. 4 is a functional block diagram of the program code of FIG. 3.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

When an operator is deploying a new network, it needs to verify that the network is working as planned. The verification may be done with actual field measurements in terms of drive tests within the deployed network and provides information related to e.g. network availability, reliability, capacity, latency and mobility. The drive tests may need to be performed also as a maintenance operation after the initial deployment phase as well as on a periodical basis. Manual drive tests by the operator are very essential part of the network planning and optimization process. However, there are drawbacks in manual drive tests. Accordingly, LTE uses Minimization of Drive Tests (MDT), which involves a set of measurements and measurement reporting procedures between UEs and the network for reducing the manual drive tests. With the MDT process, the network can request UEs to collect some measurement logs e.g. periodically or triggered by a predefined event. The UE executes the logging as requested by the network with certain constraints. The UE then provides a report of logs to the network.

The MDT measurements may be immediate measurements, which are measured by the UEs in connected mode. Alternatively, the MDT measurements may be MDT-logged measurements, which are measured and logged by the UEs in idle mode. The network can configure the UE to collect measurements during the idle mode. The UE then collects the information and later in the connected mode indicates to the network that logged measurements are available.

Figure 5:
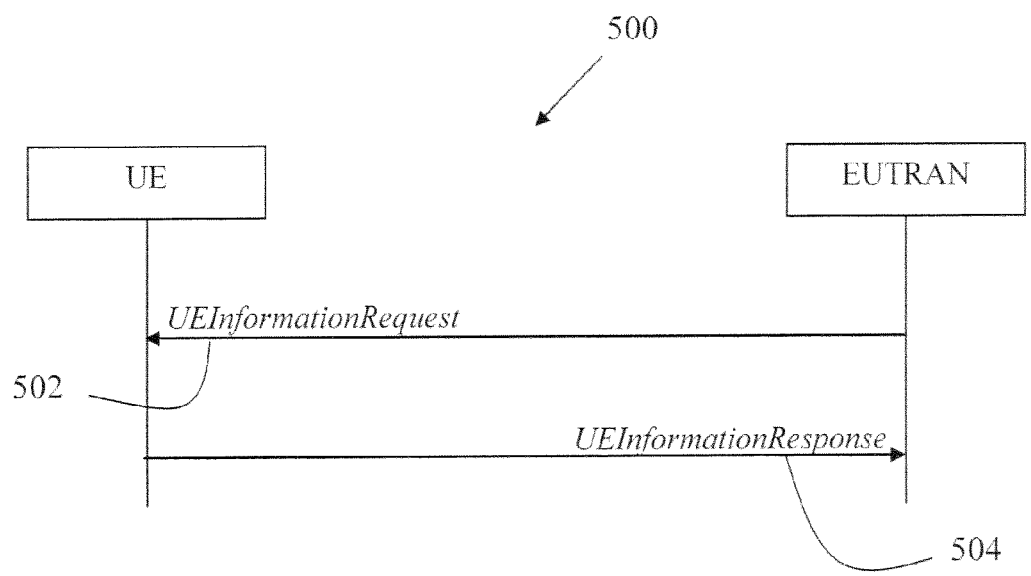
FIG. 5 is a diagram showing a method of message flow between a UE and a network.

MDT operations are described in detail in R2-106936 and R2-106937. FIG. 5 shows a method 500 of message flow of UE information procedure. At 502, a UEInformationRequest message is used by the network to request a UE to transmit the stored log (for MDT) to the network. In response, the UE transmits the logged information at 504 via a UEInformationResponse message. An indicator named logMeasAvailable is provided by which the UE indicates to the network that more data is available.

Section 5.6.5.3 of R2-106937, a portion of which is reproduced below, is directed to reception of UEInformationRequest message by the UE as follows:

---

Upon receiving the UEInformationRequest message, the UE shall:
 [ . . . ]
 1>if the logMeasReportReq is present and the plmn-Identity stored in
    VarLogMeasReport is equal to the RPLMN;
  2>if VarLogMeasReport includes one or more logged measurement
     entries, set the contents of the logMeasReport in the
     UEInformationResponse message as follows:
   3>include the absoluteTimeStamp and set it to the value of
     absoluteTimeInfo in the VarLogMeasConfig:
   3>include the mdt-MeasurementInfoList and set it to include one
     or more entries from VarLogMeasReport starting from the
     entries logged first;
   3>if the VarLogMeasReport is not empty:
    4>include the logMeasReportAvailable and set it to true;
 1>if the logMeasReport is included in the UEInformationReponse:
  2>submit the UEInformationResponse message to lower layers for
    transmission via SRB2;
  2>discard the logged measurement entries included in the mdt-
    MeasurementInfoList from VarLogMeasReport upon successful
    transmission of the UEInformationResponse message;
 1>else:
  2>submit the UEInformationResponse message to lower layers for
    transmission via SRB1;

---

According to the above, after confirming that log reporting is required, the first condition to be checked is to determine if the local variable VarLogMeasReport includes one or more logged measurement entries. If this condition is true, then mdt-MeasurementInfoList is included in a UEInformationResponse message and set it to include one or more entries from VarLogMeasReport. After mdt-MeasurementInfoList is included and set it to include one or more entries from VarLogMeasReport, a second condition is checked to determine if the VarLogMeasReport is not empty. If the VarLogMeasReport is not empty, then logMeasReportAvailable is also included and set to true. Therefore, the first and second condition checks are similar. In other words, the first and second condition checks determine whether the VarLogMeasReport is not empty. In a scenario where all of the logged measurements from VarLogMeasReport are included in the mdt-MeasurementInfoList, then in the subsequent step, i.e., second condition check, logMeasReportAvailable should not be included and should not be set to true. In the above-quoted procedure, however, logMeasReportAvailable is included and set to true because the logged measurement entries are not discarded at the time when they are included in the mdt-MeasurementInfoList because retransmission may be required, e.g. when handover to other cell before successful transmission. Rather, the logged measurement entries are discarded upon successful transmission of the UEInformationResponse message. Accordingly, in a scenario where all of the logged measurements from VarLogMeasReport are included in the mdt-MeasurementInfoList, logMeasAvailable would result in signaling overhead because when the network receives logMeasAvailable, the network may unnecessarily request the UE to transmit log again even the UE has no stored log. As a result, the unnecessary UE information procedure is increased.

According to various embodiments, when deciding whether to include logMeasAvailable in a response message, e.g. in the UEInformationResponse message, a UE checks whether all stored logged measurement entries are included in the response message. instead of the UE checking whether or not any stored logged measurement entry is available, e.g. whether VarLogMeasReport is empty or not. If not all stored logged measurement entries are included in the response message, logMeasAvailable is included in the response message and set to true. Otherwise, logMeasAvailable is not included in the response message. Because the stored logged measurement entries included in the response message are discarded upon successfully transmission of the response message, logMeasAvailable may not be included in the response message even if there are logged measurement entries stored in the UE.

Figure 6:
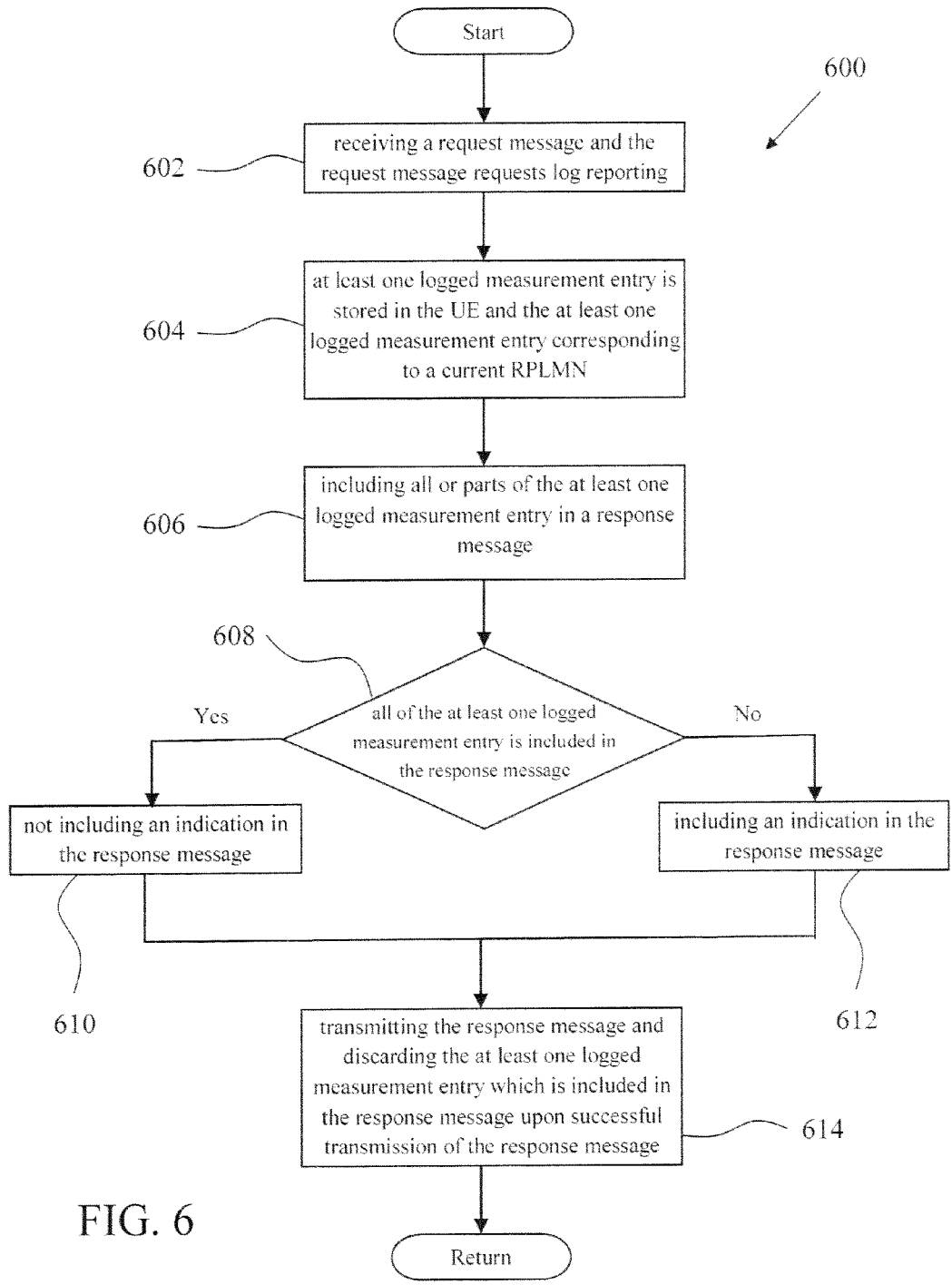
FIG. 6 shows a method of log reporting according one exemplary embodiment.

A method 600 for log reporting in a wireless communication system according to one embodiment is shown in FIG. 6. At 602. a UE receives a request message from the network. The request message from the network requests log reporting. As shown in 604, at least one logged measurement entry is stored in the UE and the at least one logged measurement entry corresponds to a current Registered Public Land Mobile Network (RPLMN). At 606, all or parts of the at least one logged measurement entry is included in a response message. However, all of parts of the at least one logged measurement entry are not discarded before submitting the response message to lower layers, e.g. Packet Data Convergence Protocol (PDCP) layer, Radio Link Control (RLC) layer, or Medium Access Control (MAC) layer. At 608, a determination is made as to whether or not all of the at least one logged measurement entry is included in the response message. If all of the at least one logged measurement entry is included in the response message, then an indication is not included in the response message at 610. The indication is configured to indicate if any more logged measurement entries stored in the LIE are not included in the response message. If all of the at least one logged measurement entry is not included in the response message, then the indication is included in the response message at 612. At 614, the response message is transmitted and upon successful transmission of the response message, the at least one logged measurement entry that was included in the response message is discarded.

The request message may be a UEInformationRequest message. The request message requesting log reporting may be with a parameter logMeasReportReq. As described in detail above, the at least one logged measurement entry may be stored in a variable VarLogMeasReport, and the at least one logged measurement entry may be included in a parameter mdt-MeasurementInfoList in the response message. The response message may be a UEInformationResponse message. The UE may discard the at least one logged measurement entry which was included in the response message after submitting the response message to the lower layers. The UE may discard the at least one logged measurement entry which was included in the response message upon successful transmission of the response message. Successful transmission of the response message may imply that the UE receives a MAC positive acknowledgment or a hybrid automatic repeat request (HARQ) acknowledgement (ACK) that corresponds to the transmitted response message. Or the successful transmission of the response message may imply that the UE receives an RLC positive acknowledgement, e.g. via a status report, that corresponds to the transmitted response messages. As described above, the indication may be the parameter logMeasAvailable or logMeasReportAvailable. The indication may be set to true when included in the response message.

According to another exemplary embodiment, upon receiving the UEInformationRequest message, the UE determines if VarLogMeasReport includes one or more logged measurement entries. If this condition is true, then mdt-MeasurementInfoList is included in a UEInformationResponse message and set it to include one or more entries from VarLogMeasReport. After mdt-MeasurementInfoList is included and set it to include one or more entries from VarLogMeasReport, a determination is made as to whether or not all of the entries from VarLogMeasReport are included in the UEInformationResponse message. If all of the entries from VarLogMeasReport are included in the UEInformationResponse message, then logMeasReportAvailable is not included in the UEInformationResponse message. However, if not all of the entries from VarLogMeasReport are included in the UEInformationResponse message, then logMeasReportAvailable is included in the UEInformationResponse message and is set to true. Accordingly, logMeasAvailable provides an indication of whether VarLogMeasReport includes more logged measurement entries which are not included in mdt-MeasurementInfoList. Thus, in a scenario where all of the logged measurements from VarLogMeasReport are included in the mdt-MeasurementInfoList, the network would not receive logMeasAvailable and the network would not request the UE to transmit log again. As a result, the unnecessary UE information procedure is prevented.

Referring to FIG. 3, which is a functional block diagram of a communication device according to one exemplary embodiment, the communication device 300 includes a program code 312 stored in memory 310. The CPU 308 executes the program code 312 to perform a method for log reporting according to various aspects of the disclosure as described above. The CPU 308 can also execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g. a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration, It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of log reporting in a wireless communication system comprising:
   receiving a request message by a user equipment (UE), the request message requesting the log reporting, wherein at least one logged measurement entry is stored in the UE and the at least one logged measurement entry corresponds to a current Registered Public Land Mobile Network (RPLMN);
   including all or parts of the at least one logged measurement entry in a response message;
   including an indication in the response message if less than all of the at least one logged measurement entry is included in the response message; and
   not including the indication in the response message if all of the at least one logged measurement entry is included in the response message;
   wherein the UE does not discard the at least one logged measurement entry which isincluded in the response message before submitting the response message to lower layers, and the UE discards the at least one logged measurement entry which was included in the response message upon successful transmission of the response message;
   wherein successful transmission of the response message is judged based on Medium Access Control (MAC) positive acknowledgement corresponding to the response message; and
   wherein the indication is one of logMeasAvailable or logMeasReportAvailable.

2. The method of claim 1, wherein the request message is a UEInformationRequest message.

3. The method of claim 1, wherein the request message requests log reporting with a parameter logMeasReportReq.

4. The method of claim 1, wherein the log is for Minimization of Drive Tests (MDT).

5. The method of claim 1, wherein the at least one logged measurement entry is stored in VarLogMeasReport.

6. The method of claim 1, wherein the at least one logged measurement entry is included in a parameter mdt-MeasurementInfoList in the response message.

7. The method of claim 1, wherein the response message is a UEInformationResponse message.

8. The method of claim 1, wherein the indication is set to true.

9. A method of log reporting in a wireless communication system comprising:
   receiving a request message by a user equipment (UE), the request message requesting the log reporting, wherein at least one logged measurement entry is stored in the UE and the at least one logged measurement entry corresponds to a current Registered Public Land Mobile Network (RPLMN);
   including all or parts of the at least one logged measurement entry in a response message;
   including an indication in the response message if less than all of the at least one logged measurement entry is included in the response message; and
   not including the indication in the response message if all of the at least one logged measurement entry is included in the response message;
   wherein the UE does not discard the at least one logged measurement entry which is included in the response message before submitting the response message to lower layers, and the UE discards the at least one logged measurement entry which was included in the response message upon successful transmission of the response message;
   wherein successful transmission of the response message is judged based on Radio Link Control (RLC) positive acknowledgement corresponding to the response message; and
   wherein the indication is one of logMeasAvailable or logMeasReportAvailable.

10. A communication device for use in a wireless communication system, the communication device comprising:
   a control circuit;
   a processor installed in the control circuit; and
   a memory installed in the control circuit and coupled to the processor:
   wherein the processor is configured to execute a program code stored in the memory to perform log reporting by:
      receiving a request message requesting the log reporting, wherein at least one logged measurement entry is stored in the communication device and the at least one logged measurement entry corresponds to a current Registered Public Land Mobile Network (RPLMN);
      including all or parts of the at least one logged measurement entry in a response message;
      including an indication in the response message if less than all of the at least one logged measurement entry is included in the response message; and
      not including the indication in the response message if all of the at least one logged measurement entry is included in the response message;

wherein the communication device does not discard the at least one logged measurement entry which is included in the response message before submitting the response message to lower layers, and the communication device discards the at least one logged measurement entry which was included in the response message upon successful transmission of the response message:

wherein the successful transmission of the response message is judged based on Medium Access Control (MAC) positive acknowledgement corresponding to the response message; and wherein the indication is one of logMeasAvailable or logMeasReportAvailable.

11. The communication device of claim 10, wherein the request message is a UEInformationRequest message.

12. The communication device of claim 10, wherein the request message requests log reporting with a parameter logMeasReportReq.

13. The communication device of claim 10, wherein the log is for Minimization of Drive Tests (MDT).

14. The communication device of claim 10, wherein the at least one logged measurement entry is stored in VarLogMeasReport.

15. The communication device of claim 10, wherein the at least one logged measurement entry is included in a parameter mdt-MeasurementInfoList in the response message.

16. The communication device of claim 10, wherein the response message is a UEInformationResponse message.

17. The communication device of claim 10, wherein the indication is set to true.

18. A communication device for use in a wireless communication system, the communication device comprising:
   a control circuit;
   a processor installed in the control circuit; and
   a memory installed in the control circuit and coupled to the processor:
   wherein the processor is configured to execute a program code stored in the memory to perform log reporting by:
      receiving a request message requesting the log reporting, wherein at least one logged measurement entry is stored in the communication device and the at least one logged measurement entry corresponds to a current Registered Public Land Mobile Network (RPLMN);
      including all or parts of the at least one logged measurement entry in a response message;
      including an indication in the response message if less than all of the at least one logged measurement entry is included in the response message; and
      not including the indication in the response message if all of the at least one logged measurement entry is included in the response message;
   wherein the communication device does not discard the at least one logged measurement entry which is included in the response message before submitting the response message to lower layers, and the communication device discards the at least one logged measurement entry which was included in the response message upon successful transmission of the response message;
   wherein successful transmission of the response is judged based on Radio Link Control (RLC) positive acknowledgement corresponding to the response message; and
   wherein the indication is one of logMeasAvailable or logMeasReportAvailable.

* * * * *